Jan. 3, 1939. J. H. YOUNG ET AL 2,142,165
FIREPROOF STRUCTURAL MEMBER OF BUILDINGS OR OTHER STRUCTURES
Filed April 10, 1936 2 Sheets-Sheet 2

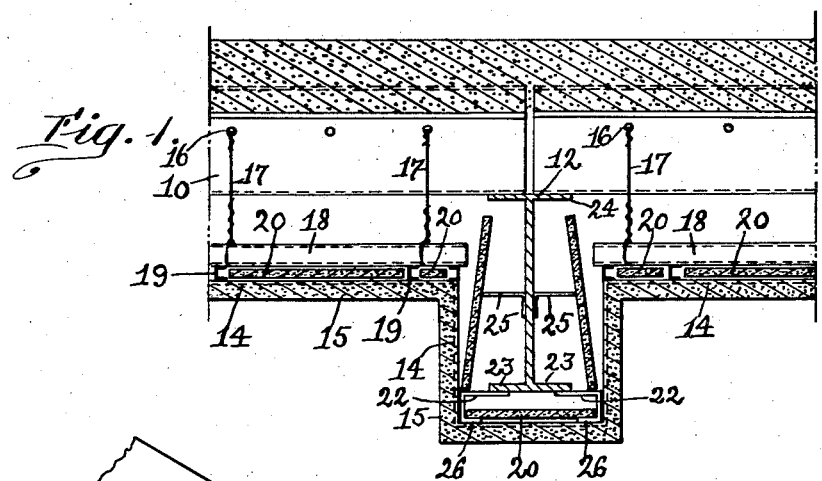
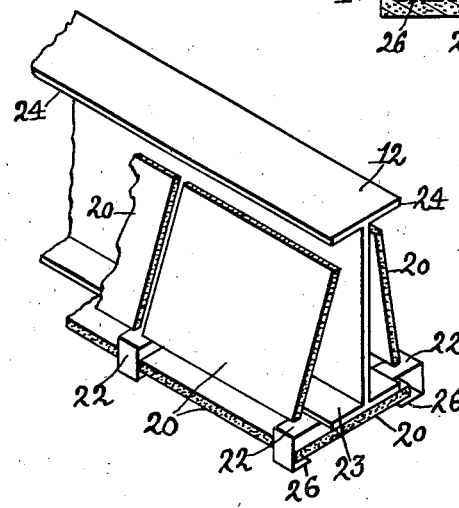
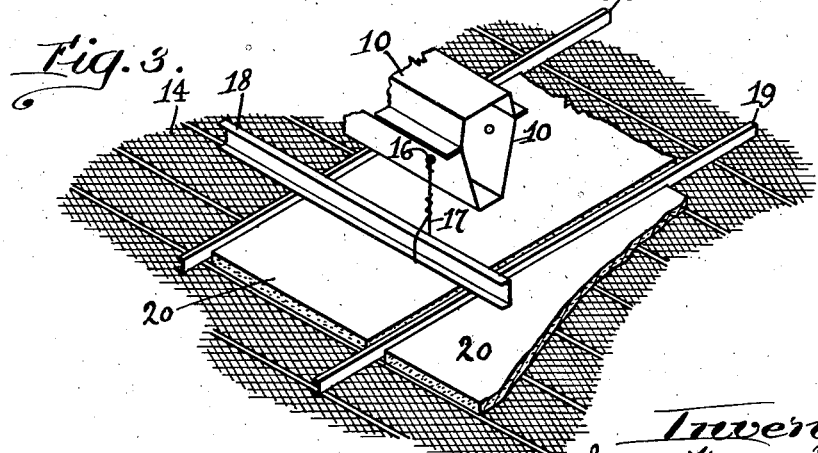

Inventors.
James Howard Young
Paul W. Jenkins
by Jas. H. Churchill Atty.

Patented Jan. 3, 1939

2,142,165

UNITED STATES PATENT OFFICE 2,142,165

FIREPROOF STRUCTURAL MEMBER OF BUILDINGS OR OTHER STRUCTURES

James Howard Young and Paul W. Jenkins, Pittsburgh, Pa., assignors to H. H. Robertson Company, Pittsburgh, Pa., a corporation of Pennsylvania Application April 10, 1936, Serial No. 73,626

2 Claims. (Cl. 72—72)

This invention relates to the fireproofing of the structural members of a building or other structure, and has for its object to effect this result in a simple and efficient manner, at a minimum cost and with the least possible labor.

To this end, the structural member to be protected has opposed to it a retaining member which is separated therefrom by a space for the reception of a body or layer of material which, in the absence of a fire, is inactive as a fireproofing member, but which, when subjected to the initial heat of a fire, is reacted upon and automatically converted into a fireproofing body or layer capable of resisting excessive temperatures of the fire and offers efficient resistance to heat transmission and thereby protects the structural member against the fire.

A material having the above characteristics, which is capable of being assembled in compact form, in which it may be readily handled and placed in operative relation to the structural member, and which is inexpensive, is vermiculite or like micaseous material in its crude or natural state or condition. Such material may be used alone in a loose state, or it may be mixed with a binder and formed into a relatively compact or thin layer or body, like a slab, which can be readily handled and placed in the desired or proper position with relation to the structural member and maintained in such position by a retaining member.

The vermiculite member in its crude or natural condition may be used with a structural member in any position, either horizontal or vertical, and when used with a floor may be supported by a retaining member below and substantially parallel with the floor, and when used with a column or other vertical or inclined member may be supported by members located between the retaining member and the structural member.

These and other features of the invention will be pointed out in the claims at the end of this specification.

Figure 5:
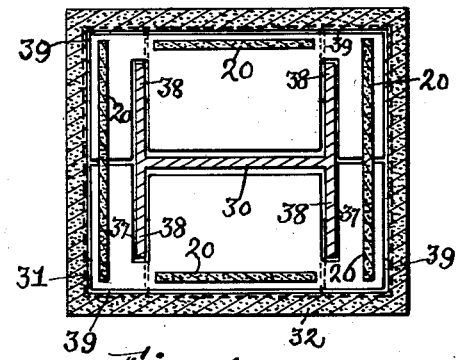
Figure 7:
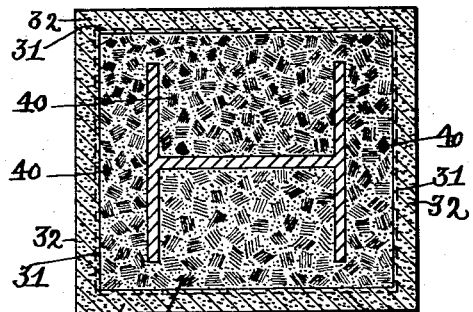
Figure 4:
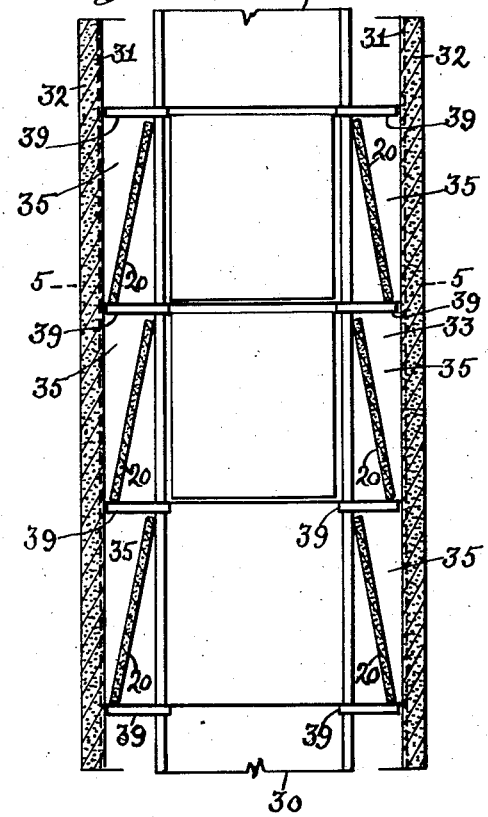
Figure 6:
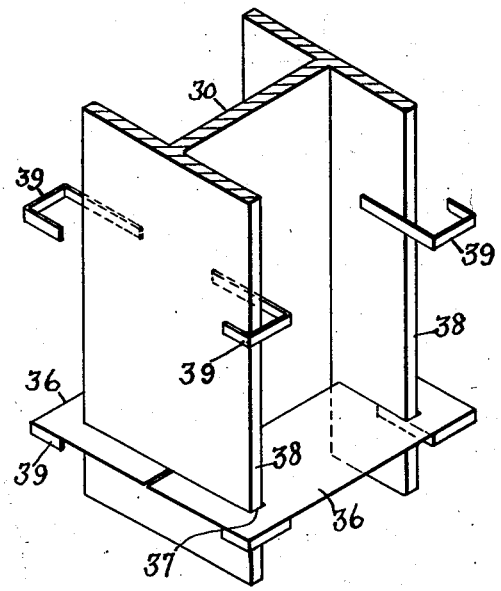

In the accompanying drawings, Fig. 1 represents a portion of a building having a metal floor and a supporting metal beam therefor fireproofed in accordance with this invention; Fig. 2 is a view in perspective showing the vermiculite slabs in place about the floor beam before the application of the lath and plaster shown in Fig. 1; Fig. 3 is a view showing the vermiculite slabs slipped in between the furring channels after the metal lath has been attached; Fig. 4 is an elevation of a column with vermiculite slabs co-operating therewith; Fig. 5 is a cross section on the line 5—5, Fig. 4; Fig. 6 is a detail of the column showing the supporting shelves and retaining members for the vermiculite slabs, and Fig. 7 is a view like Fig. 5 with the vermiculite expanded.

In Fig. 1 are shown two forms of structural members which are safeguarded against fire in accordance with this invention. The two structural members are a metal floor 10 and beams 12 upon which the metal floor is supported. The metal floor 10 is preferably of the multicellular type shown and described in U. S. Patent No. 1,867,433 dated July 12, 1932, and in the present instance only a portion of the floor 10 and one of its supporting beams is shown in Fig. 1.

A ceiling construction comprising a metal lath 14 and a plaster layer 15, is shown below the metal floor 10 and the beam 12, which ceiling construction is suspended from the metal floor in a manner commonly practised with multicellular floors, which suspension is represented by the hooks 16, wires 17, bars 18, and furring channel bars 19 to which latter the metal lath 14 is wired or otherwise attached.

The metal floor 10 and the supporting beam 12 constitute one form of structural members of the building or other structure in which such members are used, which structual members are capable of being impaired by excessive temperatures of a fire, and in accordance with this invention, said structural members have co-operating with them vermiculite or like micaseous material in its crude or natural condition, in which the vermiculite is unexpanded or unexfoliated, and contains combined water, and such vermiculite may and preferably will be assembled in the form of slabs 20, in which the vermiculite is bound together by a suitable binder which will disintegrate under the influence of a fire and therefore will not materially resist the expansion or exfoliation of the crude or natural vermiculite.

A binder of this character may be gypsum.

The slabs 20 of vermiculite and binder are compact or relatively thin and capable of being easily handled on the job, and as represented in Figs. 1 and 3, the slabs 20 which are to protect the metal floor 10, are readily slipped between the furring channel bars 19 of the ceiling construction and are supported by the metal lath 14, which also constitutes a retaining member for the floor protecting slabs 20.

In Figs. 1 and 2 are shown protecting slabs 20 for the floor supporting beam 12, which slabs are located upon opposite sides of the metal beam and are vertically arranged. As shown in Figs. 1 and 2, the vertically arranged protective slabs 20 are supported by channel metal pieces 22, which are welded or otherwise attached to the bottom flange 23 of the beam 12. The vertically arranged slabs 20 are made of sufficient size to project above the level of the horizontal slabs 20 which protect the floor 10. The vertically arranged slabs 20 are preferably extended to near the top flange 24 of the beam 12 and may rest against metal members 25 attached to the opposite sides of the web of the beam 12. The bottom flange 23 of the beam 12 is protected by a slab 20 resting upon the lower flanges 26 of the channel pieces 22.

The vermiculite in its crude or natural condition, in which the vermiculite is in its unexpanded or unexfoliated condition and contains combined water, remains in such condition in the absence of a fire, and is on guard to protect the metal floor 10 and its supporting beams 12 when a fire occurs.

If a fire should occur, the heat therefrom causes the vermiculite in the slabs 20 to expand or exfoliate and increase in volume and fill or substantially fill the space between the structural member and the retaining member, which latter in the present instance is the metal lath 14 of the ceiling construction. In this manner there is automatically produced by the fire an active protective layer or body of dehydrated and expanded vermiculite which is of materially greater thickness than the slab 20, is capable of resisting excessive temperatures of the fire, offers efficient resistance to heat transmission, and thereby affords efficient protection for the structural member against the fire.

In Figs. 1, 2 and 3, the structural members to be safeguarded are shown as horizontally arranged in the building or other structure, but it is not desired to limit the invention in this respect, as the protective slabs 20 which are inactive in the absence of a fire, may be used in connection with the structural members otherwise arranged, and in Figs. 4 and 5, the inactive slabs 20 are shown as used with a vertically arranged structural member.

Referring to Figs. 4, 5, 6 and 7, 30 represents a vertically arranged column with which the inactive slabs 20 are used. The column 30 may and preferably will be surrounded with a shell or casing of metal lath 31 and plaster 32, which is separated from the structural member 30 by a space 33 of substantial width in which the slabs 20 are located.

It is preferred to subdivide the space 33 into a plurality of chambers or compartments 35 of a height approximating the height of the slabs 20. To this end metal shelves 36 are employed which are provided with slots 37 (see Fig. 6), which enable the shelves to be slipped on the flanges 38 of the column and form supporting members upon which the slabs 20 rest. The shelves 36 may rest upon angle pieces 39 attached to the flanges of the column 30. By reference to Fig. 5, it will be observed that the column 30 on all sides is provided with inactive slabs 20 located in compartments or chambers one above the other for the length of the column. These inactive slabs are the same as those shown in Figs. 1 and 3, and remain inactive as long as a fire does not occur, but when a fire does occur they react to the fire as described in connection with the slabs 20 used with the horizontal structural members shown in Fig. 1, and the expansion of the vermiculite in its crude or natural condition, fills the chambers or compartments 35 after the manner shown in Fig. 7, and protects the column with a highly efficient fireproofing member 40 on the sides of the structural member which are exposed to the fire.

The metal lath 31 and plaster 32 constitute the retaining member for causing the vermiculite member to expand toward the structural member, and provide the latter with the protective member 40 of greater thickness than the inactive slabs 20 from which it is automatically produced by the fire.

The initially inactive slabs 20 are relatively compact or thin and inexpensive and can be handled on the job and placed in operative relation to the structural member with a minimum labor and a minimum cost.

While it may be preferred to employ the vermiculite in its crude or natural condition in the compact form of a slab in which a binder is also employed, it is not desired to limit the invention in this respect, as the vermiculite in its crude or natural state may be used alone in the form of a relatively thin layer, where the character of the structural member is such as to permit the vermiculite to be so used, as for instance in the case of the metal floor shown in Fig. 1. In such case, the slabs 20 resting on the horizontal portions of the retaining member or metal lath 14, may be replaced by a relatively thin layer of loose vermiculite in its crude or natural condition.

What is claimed is:

1. In a building or other structure, in combination, a vertically arranged structural member, a retaining member opposed to said structural member and separated therefrom to form a vertically arranged space, means for forming a plurality of compartments in said space, and relatively thin bodies of unexfoliated material vertically arranged in said compartments and capable of being exfoliated by the initial heat of a fire and automatically converted into a body of materially greater thickness and of high heat insulating value and capable of resisting excessive temperatures due to the fire.

2. In a building, in combination, a substantially vertical structural column of a material capable of being impaired by excessive temperatures of a fire, means arranged in spaced relation to said column to form a vertically extending space, and a thin body of unexfoliated material arranged in said vertical space between said column and a possible source of fire, and in its unexfoliated condition being insufficient to afford substantial fire protection to said column said body capable of being exfoliated by the initial heat of a fire and automatically converted into a heat insulating body of materially greater thickness than the thickness of said thin body and to afford substantial fire protection to said column, said means serving as a retaining means for said heat insulating body.

JAMES HOWARD YOUNG.
PAUL W. JENKINS.